(12) United States Patent
Tajiri

(10) Patent No.: US 9,116,271 B2
(45) Date of Patent: Aug. 25, 2015

(54) IMAGE PICKUP APPARATUS

(75) Inventor: Shinichiro Tajiri, Tokyo (JP)

(73) Assignee: Sony Corporation, Tokyo (JP)

( * ) Notice: Subject to any disclaimer, the term of this patent is extended or adjusted under 35 U.S.C. 154(b) by 523 days.

(21) Appl. No.: 13/410,438

(22) Filed: Mar. 2, 2012

(65) Prior Publication Data

US 2012/0229688 A1 Sep. 13, 2012

(30) Foreign Application Priority Data

Mar. 9, 2011 (JP) ................................. 2011-052002

(51) Int. Cl.
*H04N 5/225* (2006.01)
*G02B 3/00* (2006.01)
*G03B 35/08* (2006.01)
(52) U.S. Cl.
CPC ............ *G02B 3/0056* (2013.01); *G02B 3/0068* (2013.01); *G03B 35/08* (2013.01); *H04N 5/2254* (2013.01)
(58) Field of Classification Search
CPC ..................... H01L 27/14629; H04N 13/0282; H04N 5/2253; H04N 5/2254
USPC .......................................................... 348/340
See application file for complete search history.

(56) References Cited

U.S. PATENT DOCUMENTS

| 7,916,204 | B2 | 3/2011 | Wells et al. | |
| 8,400,555 | B1 * | 3/2013 | Georgiev et al. | ............... 348/345 |
| 2004/0257460 | A1 | 12/2004 | Kuriyama | |
| 2006/0256259 | A1 * | 11/2006 | Takagi et al. | ................... 349/95 |
| 2006/0289956 | A1 | 12/2006 | Boettiger et al. | |
| 2008/0151378 | A1 | 6/2008 | Kim | |

FOREIGN PATENT DOCUMENTS

| JP | 2007-004471 A | 1/2007 |
| JP | 2010-057067 A | 3/2010 |
| WO | WO 2006/066081 A1 | 6/2006 |

OTHER PUBLICATIONS

Ren, Ng, et al., "Light Field Photography with a Hand-Held Plenoptic Camera," Stanford Tech Report CTSR, Feb. 2005, pp. 1-11.

* cited by examiner

*Primary Examiner* — Christopher K Peterson
(74) *Attorney, Agent, or Firm* — Wolf, Greenfield & Sacks, P.C.

(57) ABSTRACT

An image pickup apparatus including an image pickup lens, a lens array and an image sensor is capable of reducing brightness unevenness of an image taken by the apparatus by making use of the lens array. In the image pickup apparatus for obtaining an image while separating light rays from each other to propagate in a plurality of viewpoint directions by making use of the image pickup lens, the lens array and the image sensor, the lens array is configured to include a plurality of first lens sections and a plurality of second lens sections. Principal light rays passing through the image pickup lens and the first lens sections can be guided to propagate to the light receiving surfaces of pixels on the image sensor 13 in directions approximately perpendicular to the light receiving surfaces. A local optical loss in the image sensor can be reduced.

9 Claims, 21 Drawing Sheets

F I G . 2
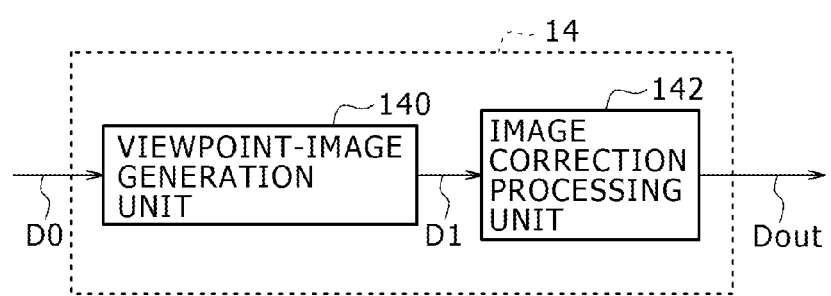

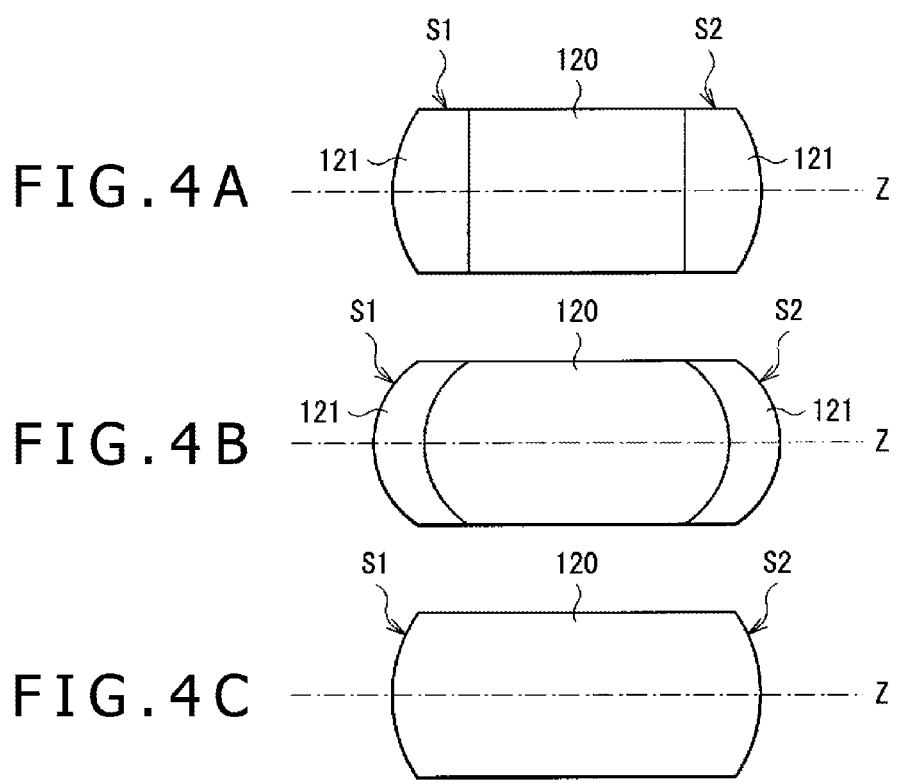

FIG.9A

| A | A | A |
|---|---|---|
| A | A | A |
| A | A | A |

FIG.9B

| B | B | B |
|---|---|---|
| B | B | B |
| B | B | B |

FIG.9C

| C | C | C |
|---|---|---|
| C | C | C |
| C | C | C |

FIG.9D

| D | D | D |
|---|---|---|
| D | D | D |
| D | D | D |

FIG.9E

| E | E | E |
|---|---|---|
| E | E | E |
| E | E | E |

FIG.9F

| F | F | F |
|---|---|---|
| F | F | F |
| F | F | F |

FIG.9G

| G | G | G |
|---|---|---|
| G | G | G |
| G | G | G |

FIG.9H

| H | H | H |
|---|---|---|
| H | H | H |
| H | H | H |

FIG.9I

| I | I | I |
|---|---|---|
| I | I | I |
| I | I | I |

IMAGE PICKUP APPARATUS

BACKGROUND

The present disclosure relates to an image pickup apparatus making use of a lens array.

In the past, a variety of image pickup apparatus have been developed and proposed as described in Ren. Ng and 7 other authors, "Light Field Photography with a Hand-Held Plenoptic Camera," Stanford Tech Report CTSR 2005-02, hereinafter referred to as Non-patent Document 1. In addition, there has been proposed an image pickup apparatus for carrying out predetermined image processing on the data of a taken image and outputting the result of the image processing. For example, as described in Non-patent Document 1, there has been proposed an image pickup apparatus adopting an image taking technique referred to as the Light Field Photography. This image pickup apparatus has a lens array provided between an image pickup lens and an image sensor also referred to hereafter as an image pickup device. To be more specific, the lens array is provided on the focal plane of the image pickup lens. Thus, a video picture created on the lens array as the video picture of an image taking object is received as light separated into light beams propagating in a plurality of viewpoint directions, allowing images at several viewpoints to be obtained at the same time.

SUMMARY

In the image pickup apparatus described above, a plurality of pixels on the image sensor are allocated to one lens in the lens array, and a viewpoint image generated in the pixels allocated to the one lens can be acquired. If 9 (=3×3) pixels are allocated to one lens in the pixel array for example, an image for nine view points can be obtained. These viewpoint images can be used as right and left viewpoint images in a display of a three-dimensional image for example.

If the lens array is provided between an image pickup lens and the image sensor, however, the quantity of light received by a pixel varies in accordance with the position of the pixel, raising a problem that unevenness results in the brightness. Since the brightness unevenness causes deteriorations of the quality of the taken image, it is expected that the problem can be solved by reducing the unevenness of the brightness.

It is desired to provide an image pickup apparatus capable of reducing unevenness of brightness in an image taken by making use of an optical system including a lens array.

An image pickup apparatus according to an embodiment of the present disclosure includes: an image pickup lens; an optical system having a lens array provided on the image creation surface of the image pickup lens; and an image pickup device for receiving transmitted light rays passing through the image pickup lens and the optical system in order to acquire data of a taken image. The optical system is configured to refract principal light rays passing through lenses composing the lens array to propagate in directions approaching the optical axes of the lenses.

In the image pickup apparatus provided by the present disclosure, light originating from an image taking object and passing through the image pickup lens is split by the lens array into light rays each propagating in a viewpoint direction and each received by the image pickup device in order to obtain the data of a taken image created from the light rays.

As described above, the optical system is configured to refract a principal light ray passing through a lens of the lens array to propagate in a direction approaching the optical axis of the lens. Thus, the principal light ray can be guided to propagate in a direction approximately perpendicular to the light receiving surface of the image pickup device.

In accordance with the present disclosure, the image pickup apparatus provided thereby is equipped with an image pickup lens, a lens array and an image pickup device. In addition, an optical system including the lens array is configured to refract a principal light ray passing through a lens of the lens array to propagate in a direction approaching the optical axis of the lens. Thus, the principal light ray coming from the optical system can be guided to propagate in a direction almost perpendicular to the light receiving surface of the image pickup device. As a result, the quantity of a local optical loss incurred in the image pickup device can be reduced. Accordingly, it is possible to decrease unevenness of brightness in an image taken by making use of the optical system including the lens array.

BRIEF DESCRIPTION OF THE DRAWINGS

FIG. 2 is a functional block diagram showing a detailed configuration of an image processing section shown in FIG. 1;

FIGS. 4A to 4C are a plurality of explanatory diagrams showing a model to be referred to in description of an integrated structure in the lens array shown in FIGS. 3A and 3B;

FIGS. 9A to 9I are a plurality of explanatory diagrams showing a model to be referred to in description of viewpoint images generated on the basis of the taken-image data shown in FIG. 8;

DETAILED DESCRIPTION OF THE PREFERRED EMBODIMENTS

Embodiments of the present disclosure are explained in detail by referring to the diagrams as follows. It is to be noted that the embodiments are explained in chapters arranged in the following order.
1: First Embodiment
A first embodiment is a typical implementation provided with lens surfaces determined in advance on a lens array itself.
2: Modification 1
A modification 1 is a typical implementation provided with an air-layer lens array.
3: Modification 2
A modification 2 is a typical implementation in which a lens array and an image sensor are integrated with each other.
4: Second Embodiment
A second embodiment is a typical implementation in which the optical axis of an on-chip lens is shifted in accordance with the position of a pixel associated with the on-chip lens.
5: Modification 3
A modification 3 is a typical implementation in which the optical axis of an on-chip lens is further shifted in accordance with the position of a pixel associated with the on-chip lens for a case in which the number of allocated pixels is increased.
6: Modification 4
A modification 4 is a typical implementation employing an image sensor of the rear-surface radiation type.

First Embodiment

[Entire Configuration]

Figure 1:
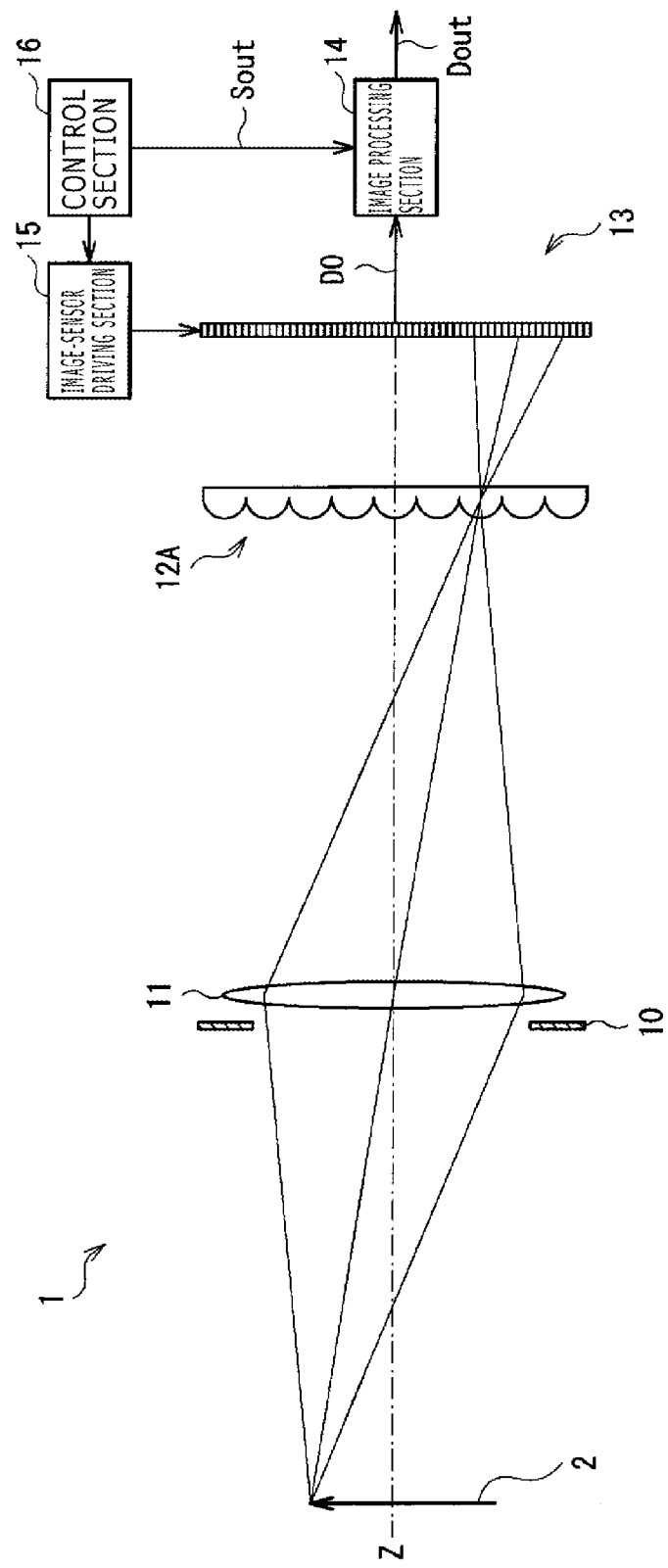
FIG. 1 is a diagram showing the entire configuration of an image pickup apparatus according to a first embodiment of the present disclosure.

FIG. 1 is a diagram showing the entire configuration of an image pickup apparatus 1 according to a first embodiment of the present disclosure. The image pickup apparatus 1 is a light field camera adopting the so-called single-eye method. With the image pickup apparatus 1, an image of an image taking object 2 is taken and image processing determined in advance is carried out on the taken image in order to output image data Dout, which serves as a viewpoint image, as a result of the image processing. As shown in the figure, the image pickup apparatus 1 employs an image pickup lens 11, a lens array 12A, an image sensor 13, an image processing section 14, an image-sensor driving section 15 and a control section 16. It is to be noted that, in the following description, a direction along the optical axis Z1 is referred to as a Z direction. In addition, on a XY plane perpendicular to the optical axis Z1, the horizontal direction or the lateral direction is referred to as an X direction whereas the vertical direction or the longitudinal direction is referred to as a Y direction.

The image pickup lens 11 is the main lens for taking an image of the image taking object 2. The image pickup lens 11 is typically the ordinary image pickup lens used in a camera such as a video camera or a still camera. On the light-incidence (or light-emanation) side of the image pickup lens 11, an aperture diaphragm 10 is provided.

By providing the lens array 12A on the focal plane (image creation plane) of the image pickup lens 11, the lens array 12A can be used as an optical system for separating incident light rays from each other to propagate in a plurality of viewpoint directions. The lens array 12A includes a plurality of micro-lenses 12A1 to be described later. The micro-lenses 12A1 are laid out in the X and Y directions to form a two-dimensional array. The micro-lenses 12A1 made from a resin material such as a photo-resist are created on a substrate, which is made from typically glass or plastic, by adoption of typically a resist reflow method or a nano imprint method. As an alternative, the micro-lenses 12A1 are created by carrying out an etching process on the principal surface of a substrate made of glass or the like. The image sensor 13 is provided on the light-emanation side of the lens array 12A.

The image sensor 13 is a sensor for receiving light rays passing through the lens array 12A and acquiring taken-image data D0 on the basis of the light rays. The image sensor 13 is composed of a plurality of pixels laid out in the X and Y directions to form a matrix. The image sensor 13 is a solid-state image pickup device such as a CCD (Charge Coupled Device) or CMOS (Complementary Metal-Oxide Semiconductor) image sensor. On the light-incidence side (the side facing the lens array 12A) of the image sensor 13, a color-filter layer 132 and an on-chip lens 133 for each of the pixels are provided. The color-filter layer 132 and the on-chip lenses 133 will be described later.

The image processing section 14 is a section for carrying out image processing determined in advance on the taken-image data D0 acquired by the image sensor 13 and, as a result of the image processing, outputting the image data Dout serving as typically a viewpoint image. FIG. 2 is a functional block diagram showing a detailed configuration of the image processing section 14. As shown in the figure, the image processing section 14 typically has a viewpoint-image generation unit 140 and an image correction processing unit 142. Concrete operations of the image processing carried out by the image processing section 14 will be described later.

The image-sensor driving section 15 is a section for driving the image sensor 13 in order to control the exposure and read operations of the image sensor 13.

The control section 16 is a section for controlling operations carried out by the image processing section 14 and the image-sensor driving section 15. Typically, the control section 16 is configured to include a microcomputer or the like.

(Typical Detailed Configuration of the Lens Array 12A)

Figure 3A:
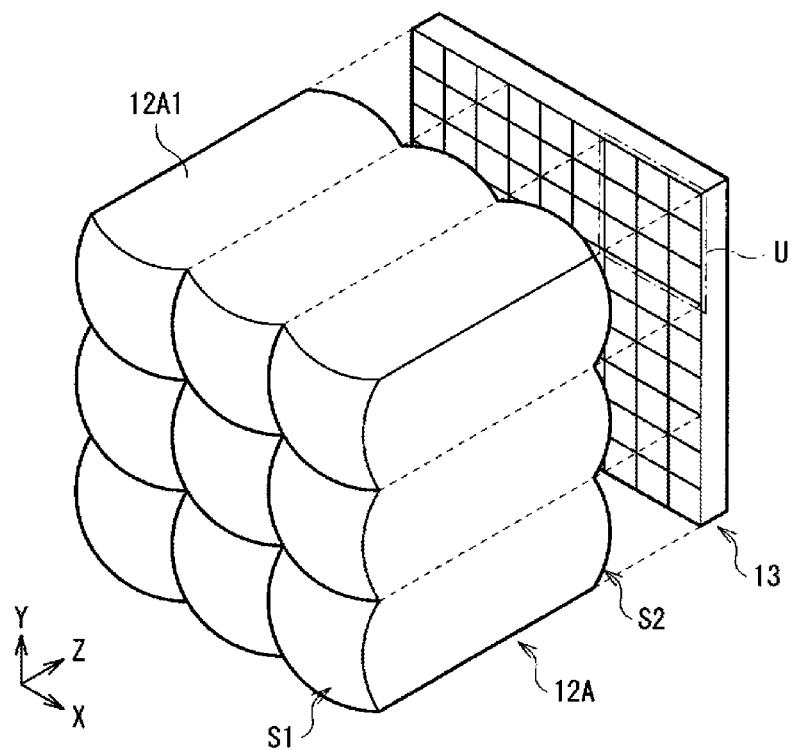
FIGS. 3A and 3B are a plurality of perspective diagrams showing a model representing a rough configuration of a lens array and an image sensor which are shown in FIG. 1.
Figure 3B:
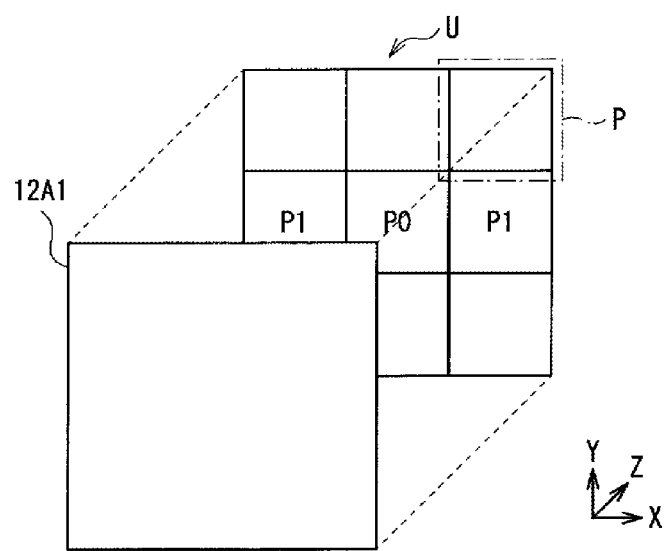

FIG. 3A is a perspective diagram showing the lens array 12A and the image sensor 13. On the other hand, FIG. 3B is a perspective diagram showing a relation between a micro-lens 12A1 included in the lens array 12A and pixels which are allocated to the micro-lens 12A1. In this embodiment, every micro-lens 12A1 included in the lens array 12A has a first lens section S1 on the light-incidence side of the lens array 12A and a second lens section S2 on the light-emanation side of the lens array 12A. That is to say, the first lens section S1 and the second lens section S2 form the micro-lens 12A1. The first lens section S1 and the second lens section S2 rightly face each other. That is to say, a line connecting the first lens section S1 to the second lens section S2 is parallel to the optical axis of the micro-lens 12A1. The light-incidence side of the lens array 12A is the side facing the image pickup lens 11 whereas the light-emanation side of the lens array 12A is a side facing the image sensor 13. As described before, a plurality of aforementioned micro-lens 12A1 are laid out in the X and Y directions to compose the lens array 12A. It is to be noted that, for the sake of simplicity, FIG. 3A shows only 9 (=3×3) micro-lenses 12A1 laid out in the X and Y directions to form the lens array 12A whereas FIG. 3B shows only 9 (=3×3) pixels P included in the image sensor 13 as a block area U allocated to one micro-lens 12A1. Thus, the image sensor 13 has nine block areas U composed of 9×9 pixels P allocated to such a lens array 12A.

The first lens section S1 is provided typically on the focal plane of the image pickup lens 11. Thus, the first lens section S1 guides incident light rays, which come from the image pickup lens 11, in a direction toward the image sensor 13, while separating the incident light rays from each other to propagate in a plurality of viewpoint directions. The second lens section S2 has a function to refract a principal light ray passing through the first lens section S1 to propagate in a direction approaching the optical axis of each micro-lens 12A1 (first lens section S1).

To put it in detail, in the micro-lens 12A1, the first lens section S1 and the second lens section S2 are provided in such a way that the focal plane of the second lens section S2 is placed on the principal surface (or the principal planar surface) of the first lens section S1 whereas the focal plane of the first lens section S1 is placed on the principal surface of the second lens section S2. If the focal plane of the second lens section S2 is placed on the principal surface of the first lens section S1 whereas the focal plane of the first lens section S1 is placed on the principal surface of the second lens section S2 in the first lens section S1 and the second lens section S2 which rightly face each other as described above, the shape of the micro-lens 12A1 and the material used for making the micro-lens 12A1 do not need to be prescribed in particular. In this case, the statement stating that the shape of the micro-lens 12A1 is not prescribed in particular implies that the lens surface on the object side can be convex or concave, the lens surface on the image side can be convex or concave and the curvatures of the lens surfaces can have an arbitrary value. It is to be noted, however, that the description is given for a case in which the first lens section S1 has a lens shape with a convex surface exposed to the image pickup lens 11 whereas the second lens section S2 has a lens shape with a convex surface exposed to the image sensor 13.

This embodiment has an integrated structure which implies that the first lens section S1 and the second lens section S2 are provided by integrating the first lens section S1 and the second lens section S2 with each other. FIGS. 4A to 4C are explanatory diagrams referred to in the following description of a typical integrated structure of the first lens section S1 and the second lens section S2. As shown in FIGS. 4A and 4B, the first lens section S1 and the second lens section S2 can be configured to have a structure including lens layers 121 made from typically a resin material such as a photo-resist on both sides of a substrate 120 which is made from typically glass or plastic. In this case, each of the first lens section S1 and the second lens section S2 can have a planar-convex shape as shown in FIG. 4A or a concave-convex shape as shown in FIG. 4B. As an alternative, each of the first lens section S1 and the second lens section S2 can have a convex-convex shape or a concave-concave shape as shown in none of the figures. The lens shapes of the first lens section S1 and the second lens section S2 can be set properly by taking the refraction index of the resin material used for making the lens layer 121 into consideration. In addition, the first lens section S1 and the second lens section S2 can have a single-layer structure or a multi-layer structure including stacked layers made from different materials. On top of that, as long as the focal plane of the second lens section S2 is placed on the principal surface of the first lens section S1 whereas the focal plane of the first lens section S1 is placed on the principal surface of the second lens section S2 in the first lens section S1 and the second lens section S2 which rightly face each other as described above, the first lens section S1 and the second lens section S2 do not have to have the same lens shape and do not have to be made from the same lens material, that is, the first lens section S1 and the second lens section S2 can have lens shapes different from each other and can be made from lens materials different from each other.

As another alternative, the lens shapes can be formed by carrying out an etching process to be followed immediately by a patterning process on both sides of the substrate 120 serving as a base material as shown in FIG. 4C.

On the light-emanation side of the lens array 12A having the first lens section S1 and the second lens section S2 which have been described above, the image sensor 13 is provided by separating the image sensor 13 from the lens array 12A by a gap determined in advance. That is to say, the image sensor 13 is provided at such a position that the image sensor 13 is capable of receiving light rays passing through the lens array 12A. Each block area U on the image sensor 13 is allocated to one of micro-lenses 12A1 composing the lens array 12A. As described before, a block area U includes m×n pixels P provided on the image sensor 13. The XY planar shape of the micro-lens 12A1 is the same as the rectangular shape of the block area U. Notations m and n denote integers equal to or greater than 1. However, the case of m=n=1 is not applicable. For m=n for example, the XY planar shape of the micro-lens 12A1 is the same as the square shape of the block area U and the micro-lens 12A1 is provided at a position exposed to the block area U. If the value of m×n is increased, the number of pixels P allocated to a micro-lens 12A1 also rises. Thus, the number of obtained viewpoint images also increases as well. That is to say, the number of separable viewpoints also rises as well. If the value of m×n is reduced, on the other hand, the number of pixels P allocated to a micro-lens 12A1 also decreases as well. In this case, the number of pixels P in each viewpoint image increases. It is to be noted that the number of pixels P in each viewpoint image represents the resolution. The description is given by taking the case of m=n=3 as an example. In this case, each block area U having 3×3 pixels P is allocated to one of micro-lenses 12A1.

(Typical Configuration of the Image Sensor 13 and an on-Chip Lens 133)

Figure 5:
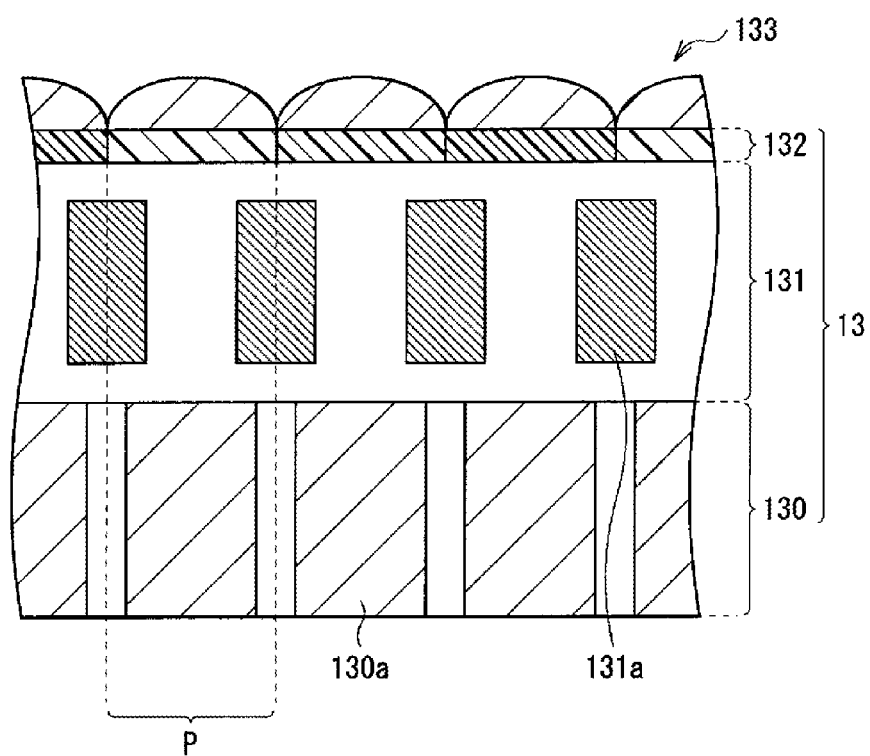
FIG. 5 is a diagram showing a model representing a rough configuration of the front-surface radiation image sensor shown in FIG. 1 and on-chip lenses of the image sensor.

FIG. 5 is a diagram showing a cross-sectional configuration of the image sensor 13 and on-chip lenses 133 provided in the image sensor 13. As shown in the figure, the image sensor 13 is made as a stack by creating a wiring layer 131 on a sensor section 130 and then creating a color-filter layer 132 on the wiring layer 131. The sensor section 130 includes a photoelectric transducer such as a PIN photodiode for each of the on-chip lenses 133. For every pixel P, the on-chip lens 133 serving as a light converging lens is provided on the color-filter layer 132 of the image sensor 13. The image sensor 13 is the so-called front-surface radiation CMOS image sensor in which the wiring layer 131 is provided on the light receiving surface of the sensor section 130.

The color-filter layer 132 includes filters for different colors such as R (red), G (green) and B (blue) colors. For example, the filters for different colors are laid out to form a Bayer array having typical ratios of 1:2:1.

Figure 6:
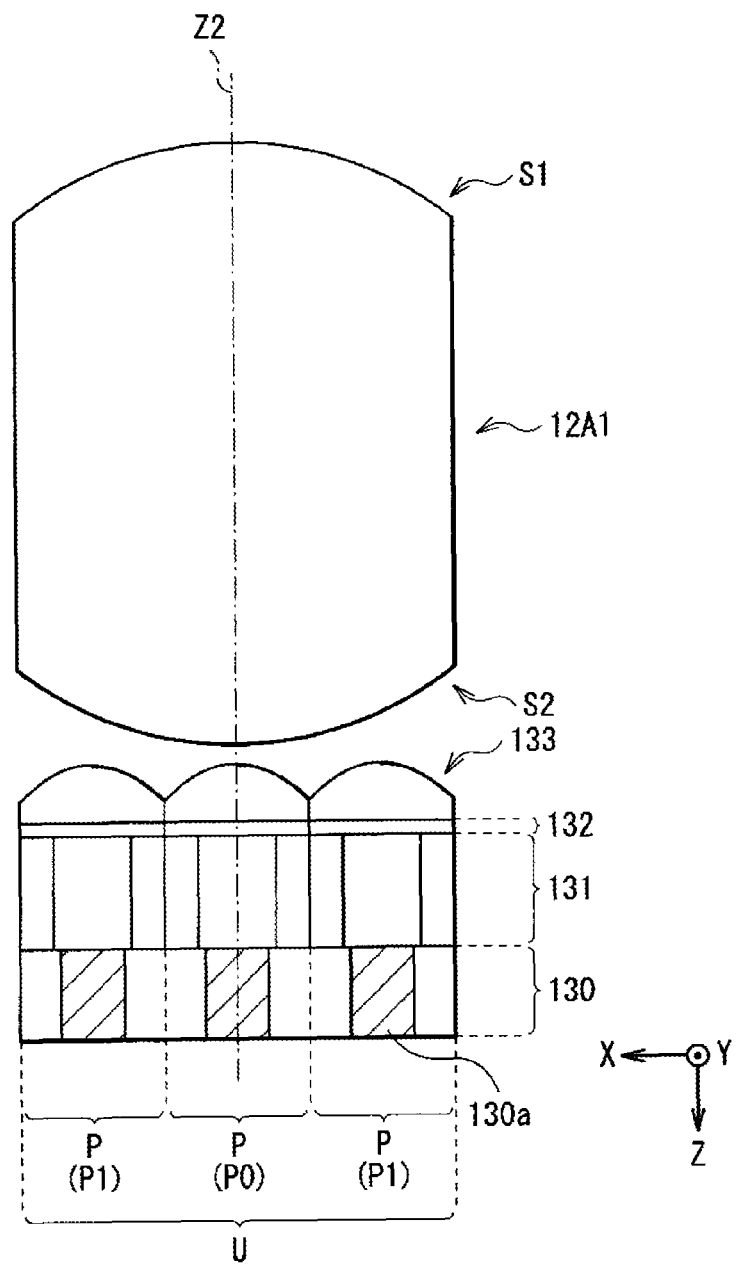
FIG. 6 is a diagram showing a model representing the layout configuration of a micro-lens, on-chip lenses and an image sensor including the on-chip lenses.

FIG. 6 is a diagram showing an XZ cross-sectional configuration of the micro-lens 12A1, the on-chip lenses 133 and the image sensor 13. To put it in detail, the diagram shows an XZ cross section along the optical axis Z2 of the micro-lens 12A1. The XZ cross section is an XZ cross section passing through a central pixel P0 and peripheral pixels P1. The central pixel P0 is a pixel P provided at the center of the block area U whereas a peripheral pixel P1 is a pixel P adjacent to the central pixel P0 and separated from the central pixel P0 in the X direction. In such a configuration of the embodiment, the second lens section S2 of the micro-lens 12A1 having the first lens section S1 and the second lens section S2 as described before is provided to rightly face a block area U in the image sensor 13 and is separated away from the block area U by a gap determined in advance. Thus, as will be described later in detail, a light ray incident to the micro-lens 12A1 is refracted by the first lens section S1 and the second lens section S2, being guided to the sensor section 130 included in the image sensor 13.

[Functions and Effects]
(1. Acquisition of Taken-Image Data)

Figures 7, 8:
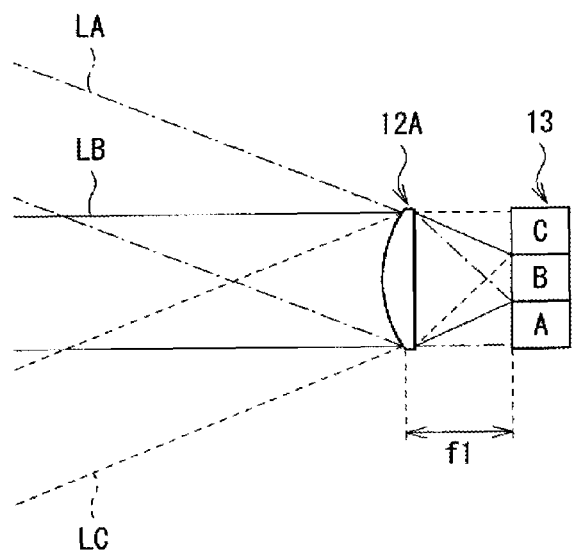
FIG. 7 is an explanatory diagram showing a model to be referred to in description of separation of incident light rays to propagate in a plurality of viewpoint directions.
FIG. 8 is an explanatory diagram showing a model to be referred to in description of taken-image data acquired by the image sensor.

In the image pickup apparatus 1, the lens array 12A is provided at a position between the image pickup lens 11 and the image sensor 13. To be more specific, the lens array 12A is provided on the focal plane of the image pickup lens 11. Thus, in the image sensor 13, a light ray emitted by the image taking object 2 is recorded as a light-ray vector including information on the propagation direction (or the viewpoint direction) of the light ray in addition to information on the strength of the light ray. That is to say, incident light rays passing through the lens array 12A are separated away from each other to propagate in a plurality of viewpoint directions, and the light rays propagating in the viewpoint directions are received by different pixels P on the image sensor 13. For example, as shown in FIG. 7, some of light rays passing through the image pickup lens 11 and propagating to the lens array 12A include a light ray (or a light flux) LA, a light ray LB and a light ray LC. The light ray LA is a light ray which comes from a first viewpoint in a certain viewpoint direction and is received by a pixel A. The light ray LB is a light ray which comes from a second viewpoint in another viewpoint direction different from the certain viewpoint direction and is received by a pixel B. The light ray LC is a light ray which comes from a third viewpoint in a further viewpoint direction different from the certain viewpoint direction and the other viewpoint direction, being received by a pixel C. In this way, light rays coming from a micro-lens 12A1 in a plurality of viewpoint directions different from each other are received by different pixels of a block area U allocated to the micro-lens 12A1. In accordance with a driving operation carried out by the image-sensor driving section 15, the image sensor 13 performs typically read operations sequentially line after line in order to acquire taken-image data D0.

FIG. 8 is an explanatory diagram showing a model referred to in the following description of a pixel data array of the taken-image data D0. As explained earlier in the description of the embodiment, each block area U including 3×3 pixels P is assigned to one micro-lens 12A1. In this case, for every block area U in the image sensor 13, light rays coming from nine viewpoint directions are received in an operation to receive pixel data A to pixel data I. It is to be noted that the taken-image data D0 shown in FIG. 8 is conceptually shown taken-image data D0 obtained from nine block areas U to form an area of 9×9 pixels P in the image sensor 13. This taken-image data D0 is recorded as data having colors corresponding to a color array in the color-filter layer 132 provided in the image sensor 13. The taken-image data D0 obtained as described above is output to the image processing section 14.

(2. Generation of Viewpoint Images)

The viewpoint-image generation unit 140 employed in the image processing section 14 shown in FIG. 2 caries out predetermined image processing on the basis of the taken-image data D0 received from the image sensor 13 in order to output image data Dout representing viewpoint images as a result of the image processing.

To put it concretely, first of all, the viewpoint-image generation unit 140 carries out processing to generate a plurality of viewpoint images on the basis of the taken-image data D0. That is to say, for the taken-image data D0 like the one shown in FIG. 8, the viewpoint-image generation unit 140 synthesizes pieces of pixel data of the same viewpoint direction. The pieces of pixel data of the same viewpoint direction are pieces of pixel data extracted from pixels existing at the same position in block areas U. For example, all pieces of pixel data A are extracted from the taken-image data D0 shown in FIG. 8 and synthesized in order to generate synthesized data shown in FIG. 9A as data of a viewpoint image. This synthesis processing is also carried out in the same way on the other pieces of pixel data B to I in order to generate pieces of synthesized data shown in FIG. 9B to 9I respectively as data of their respective viewpoint images. In this way, the viewpoint-image generation unit 140 generates a plurality of viewpoint images on the basis of the taken-image data D0. In the typical example shown in FIGS. 9A to 9I, the viewpoint images are a total of nine viewpoint images for the first to ninth viewpoints respectively. These viewpoint images are output to the image correction processing unit 142 as viewpoint-image data D1.

As described above, the viewpoint images obtained as a result of the synthesis processing explained above are output to the image correction processing unit 142 as viewpoint-image data D1. The image correction processing unit 142 carries out various kinds of image processing on the viewpoint-image data D1 and outputs viewpoint image data resulting from the image processing as the image data Dout. The image processing typically includes color interpolation processing, white-balance adjustment processing and gamma correction processing. A typical example of the color interpolation processing is demosaic processing. The image data Dout can also be output to a recipient provided externally to the image pickup apparatus 1 or stored in a recording section provided inside the image pickup apparatus 1 but not shown in the figure.

It is to be noted, however, that the image data Dout can be data for viewpoint images or the taken-image data D0 existing prior to the generation of the viewpoint images. If the taken-image data D0 existing prior to the generation of the viewpoint images is taken as the image data Dout, a data array read out from the image sensor 13 as the taken-image data D0 is output to the recipient provided externally to the image pickup apparatus 1 or stored in the recording section as it is without the need to carry out the processing to generate viewpoint images likes the ones described above, that is, without the need to carry out processing to extract the viewpoint images from the taken-image data D0, synthesize the extracted viewpoint images and then rearrange the synthesized images.

FIGS. 10A to 10I show respectively viewpoint images R1 to R9 which are concrete typical examples of viewpoint images corresponding to the data arrays shown in FIGS. 9A to 9I respectively. The image of the image taking object 2 includes images Ra, Rb and Rc of three image taking objects which are a person, a mountain and a flower. The person, the mountain and the flower are located at positions separated away from each other in the screen-depth direction. The viewpoint images R1 to R9 are each an image taken by adjusting the focal point of the image pickup lens 11 to the position of the person who is one of the three image taking objects. That is to say, in each of the viewpoint images R1 to R9, the image Rb of the mountain located at a position farther from the viewer than the position of the person and the image Rc of the flower located at a position closer to the viewer than the position of the person are each a defocused image. In the image pickup apparatus 1, the focused image Ra of the person is not shifted in the viewpoint images R1 to R9 taken for different viewpoints. However, the defocused images Rb and Rc are shifted in the viewpoint images R1 to R9. It is to be noted that FIGS. 10A to 10I show the positional shifts made in the viewpoint images R1 to R9 respectively as the positional shifts of the images Rb and Rc by excessively exaggerating the shifts.

Figure 10C:
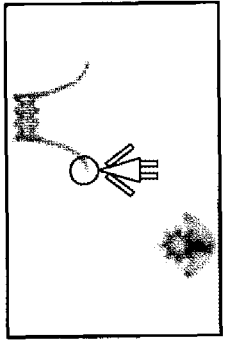
FIGS. 10A to 10I are a plurality of explanatory diagrams showing typical examples of the viewpoint images shown in FIGS. 9A to 9I.
Figure 10F:
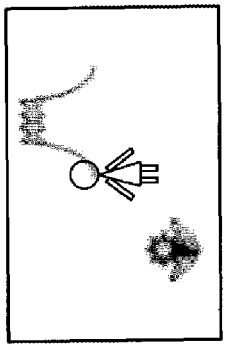
Figure 10I:
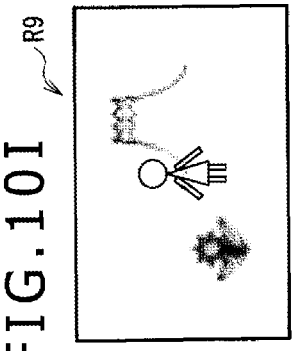
Figure 10B:
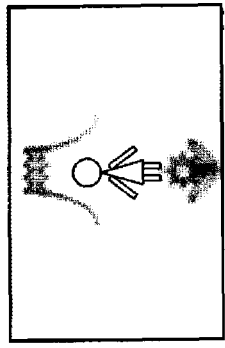
Figure 10E:
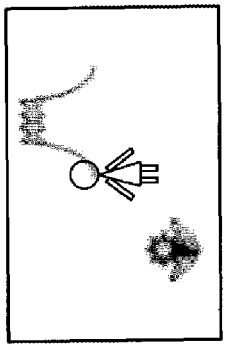
Figure 10H:
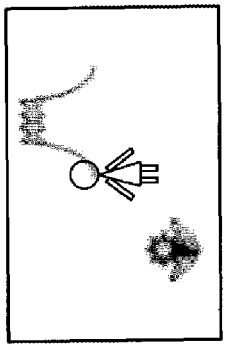
Figure 10A:
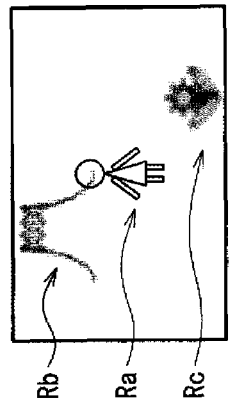
Figure 10D:
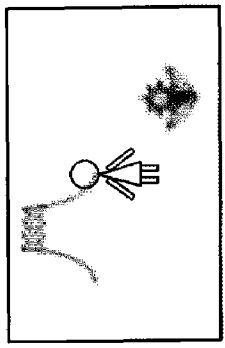
Figure 10G:
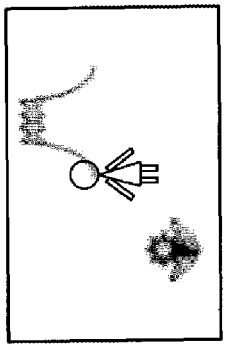
Figure 11A:
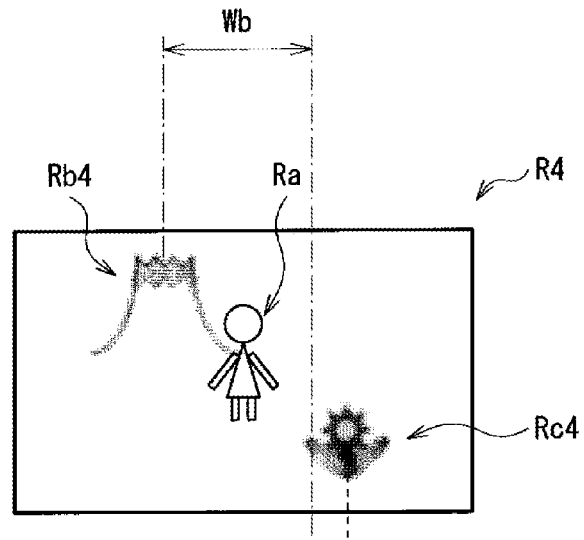
FIGS. 11A and 11B are a plurality of explanatory diagrams showing a model to be referred to in description of the quantity of a disparity between viewpoint images.
Figure 11B:
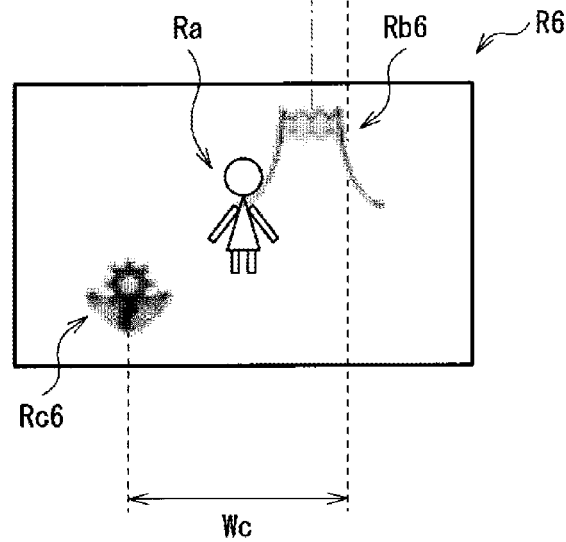

The nine viewpoint images R1 to R9 like the ones described above can be used in a variety of applications as a multi-viewpoint image having a disparity varying from viewpoint to viewpoint. For example, two viewpoint images for the right viewpoint direction and the left viewpoint direction respectively can be used to display a three-dimensional image. In this case, the stereoscopic effect of the displayed three-dimensional image is determined by the quantity of a disparity between the two viewpoint images. If the viewpoint image R4 shown in FIG. 10D and the viewpoint image R6 shown in FIG. 10F are used as the two viewpoint images for example, the stereoscopic effect of the displayed three-dimensional image can be explained as follows. The mountain appears at a position farther from the viewer than the position of the person is. In this case, as shown in FIGS. 11A and 11B, the degree of the farness of the position at which the mountain is seen by the viewer is determined by a disparity quantity Wb which is a positional shift between an image Rb4 in the viewpoint R4 shown in FIG. 11A and an image Rb6 in the viewpoint R6 shown in FIG. 11B. On the other hand, the flower appears at a position closer to the viewer than the position of the person is. In this case, the degree of the closeness of the position at which the flower is seen by the viewer is determined by a disparity quantity Wc which is a positional shift between an image Rc4 in the viewpoint R4 shown in FIG. 11A and an image Rc6 in the viewpoint R6 shown in FIG. 11B. In addition, the larger the disparity quantity Wb, the farther the position at which the mountain is seen by the viewer. By the same token, the larger the disparity quantity Wc, the closer the position at which the flower is seen by the viewer.

(Functions of the Lens Array 12A)

As described above, light rays passing through the image pickup lens 11 are guided by the lens array 12A to the image sensor 13 while being separated by the lens array 12A from each other to propagate in a plurality of viewpoint directions. Thus, the light rays propagating in the viewpoint directions can be received by pixels P on the image sensor 13. The following description explains functions that can be carried out by virtue of the lens array 12A having the first lens section S1 and the second lens section S2 like the ones described before by comparing the functions with those of a typical comparison configuration shown in FIG. 12.

(Typical Comparison Configuration)

Figure 12:
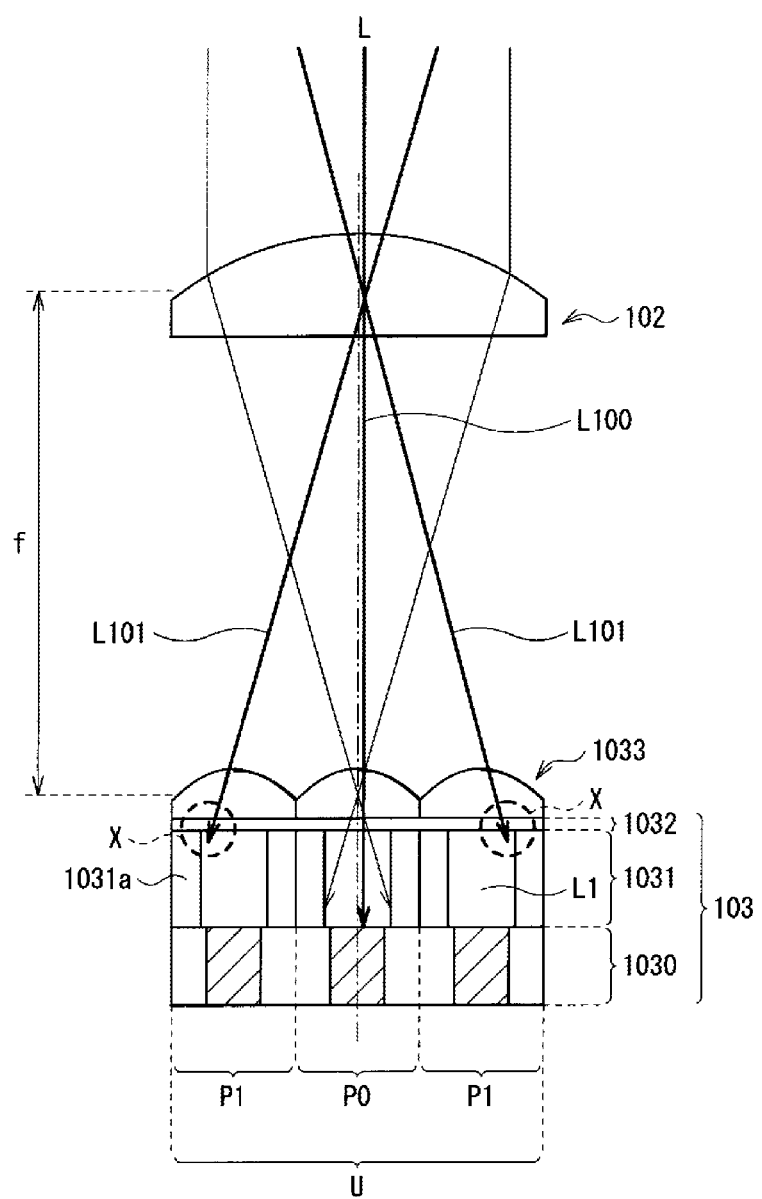
FIG. 12 is an explanatory diagram showing a model to be referred to in description of light rays incident to an image sensor in a typical comparison configuration.

FIG. 12 is an explanatory diagram referred to in the following description of light rays incident to an image sensor 103 in a typical comparison configuration to be compared with the embodiment for a case in which a micro-lens 102 has a focal distance f. An on-chip lens 1033 is provided at a position separated away from the micro-lens 102 by a distance equal to the focal distance f of the micro-lens 102. A light ray passing through the micro-lens 102 is converged by the on-chip lens 1033 and then guided to a sensor section 1030 employed in the image sensor 103.

In such a typical comparison configuration, principal light rays passing through the micro-lens 102 include a principal light ray L100 which is incident to a central pixel P0 existing at the center of a block area U in the image sensor 103. The principal light ray L100 has been propagating along the optical axis of the micro-lens 102 and is incident to the light receiving surface of the sensor section 1030 in a direction perpendicular to the light receiving surface. Thus, the principal light ray L100 passing through the micro-lens 102 is received by the central pixel P0 with an almost no loss.

However, an incident principal light ray L101 propagating to a peripheral pixel P1 of the block area U after passing through the micro-lens 102 hits the peripheral pixel P1 in a direction inclined with respect to the block area U including the peripheral pixel P1. Thus, the principal light ray L101 is absorbed by typically a wiring layer 1031 and the like as indicated by notation X in the figure before the principal light ray L101 arrives at the sensor section 1030. As a result, in comparison with the principal light ray L100 received by the central pixel P0, the quantity of the principal light ray L101 is small. In addition, since the principal light ray L101 is also absorbed by a metal 1031a provided on the wiring layer 1031, electrons in the metal 1031a are excited due to the so-called opto-electrical conversion effect and become noise components in the data of the taken image. Such unevenness generated in accordance with the positions of pixels as the unevenness of the quantity of received light and the noise components generated due to the so-called photoelectric effect cause the quality of the image to deteriorate.

(Embodiment)

Figure 13:
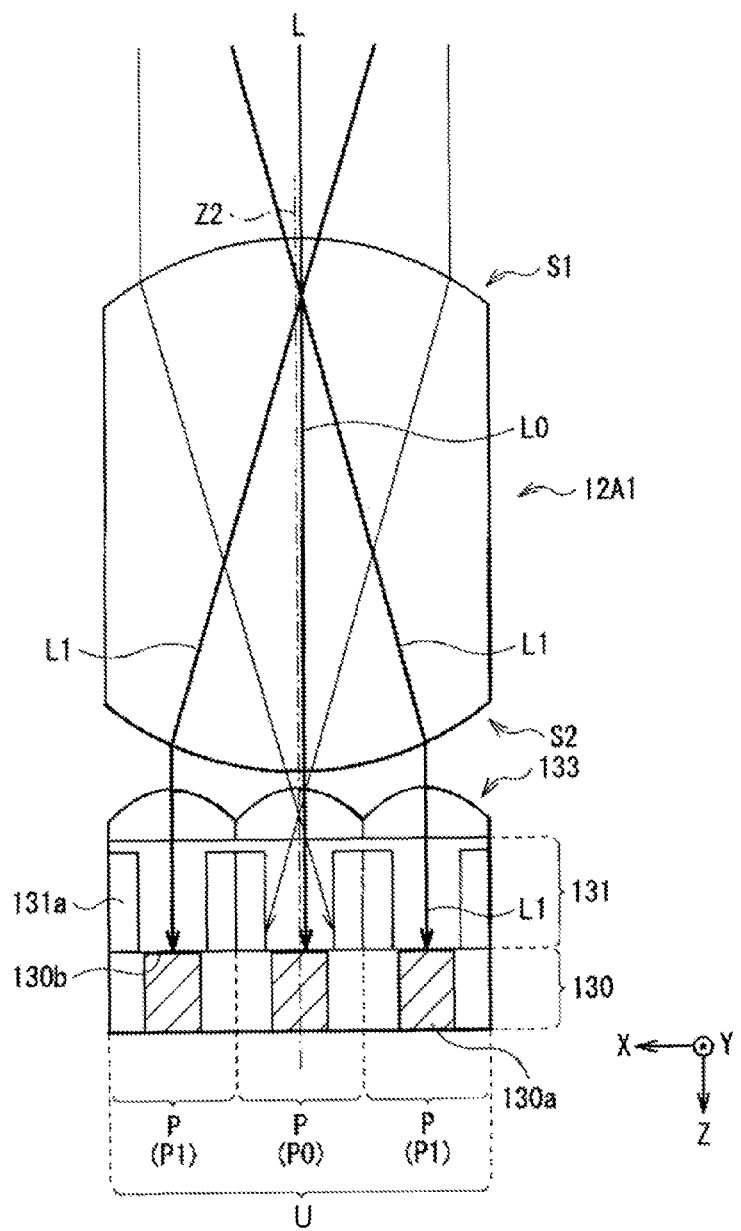
FIG. 13 is an explanatory diagram showing a model to be referred to in description of light rays incident to the image sensor in the first embodiment.

In the embodiment of the present disclosure, on the other hand, each micro-lens 12A1 of the lens array 12A has a first lens section S1 and a second lens section S2 which are provided at positions related to each other in accordance with a positional relation determined in advance as shown in FIG. 13. Principal light rays L passing through the image pickup lens 11 and the first lens section S1 include a principal light ray L0 which propagates to the central pixel P0 in a block area U of the image sensor 13. Thus, the principal light ray L0 propagating to the central pixel P0 passes through the micro-lens 12A1 along the optical axis Z2 and then hits the light receiving surface 130b of the sensor section 130 in a direction perpendicular or approximately perpendicular to the light receiving surface 130b. That is to say, the principal light ray L0 propagating to the central pixel P0 hits the photodiode 130a in a direction perpendicular or approximately perpendicular to the light receiving surface 130b. As a result, in the central pixel P0, the photodiode 130a is capable of easily receiving the principal light ray L0 passing through the micro-lens 12A1 without incurring a loss.

In addition, the principal light rays L also include a principal light ray L1 which propagates in a direction toward a peripheral pixel P1 in the block area U. In the second lens section S2, however, the principal light ray L1 is refracted to propagate in a direction approaching the optical axis Z2. It is to be noted that, as shown in none of the figures, a principal light ray propagating to a peripheral pixel adjacent to the central pixel P0 in a diagonal direction in the block area U is also refracted in the second lens section S2 in the same way as the principal light ray L1 to propagate in a direction approaching the optical axis Z2. Thus, the principal light rays L passing through the image pickup lens 11 and the first lens section S1 are capable of arriving at the pixels P with ease in a direction approximately perpendicular to the light receiving surface 130b. That is to say, it is possible to reduce the number of cases in which an optical loss is incurred so that it is possible to avoid generation of unevenness of the quantity of the received light. An optical loss is incurred due to, among other causes, absorption of a light ray into the sensor section 130 at a local area. In addition, since the quantity of a light ray absorbed by the sensor section 130 is reduced, it is possible to prevent noises from being generated due to the opto-electrical conversion effect.

As described above, according to the embodiment, in the image pickup apparatus 1 making use of the image pickup lens 11, the lens array 12A and the image sensor 13 to obtain an image while separating incident light rays from each other to propagate in a plurality of viewpoint directions, the lens array 12A has a first lens section S1 and a second lens section S2 which are provided at positions related to each other in accordance with a positional relation determined in advance. Thus, by providing the lens array 12A with the second lens section S2 in this way, principal light rays passing through the image pickup lens 11 and the first lens section S1 can be made incident to the light receiving surface 130b of the pixels P on the image sensor 13 in a direction approximately perpendicular to the light receiving surface 130b. Accordingly, the local optical loss incurred in the image sensor 13 can be reduced. As a result, it is possible to decrease unevenness of brightness in an image taken by making use of an optical system including the lens array 12A.

Figure 14A:
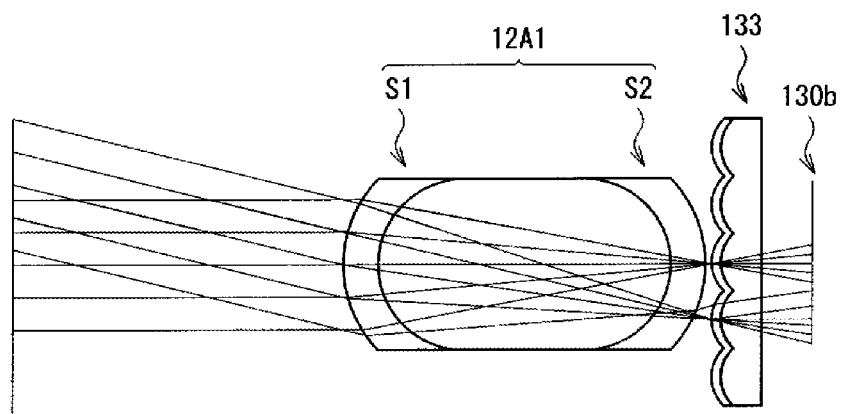
FIGS. 14A and 14B are a plurality of explanatory diagrams showing typical simulations of light rays in the first embodiment and the typical comparison configuration respectively.
Figure 14B:
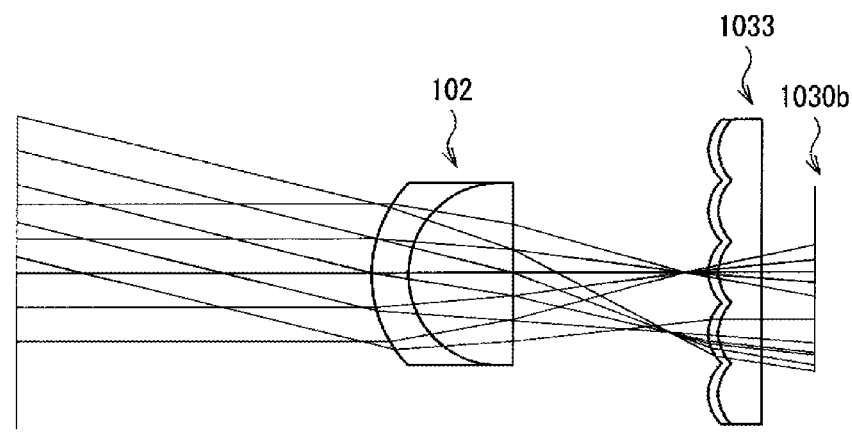

FIGS. 14A and 14B are explanatory diagrams showing typical simulations of light rays in the first embodiment and the typical comparison configuration respectively. As described above, the embodiment employs the lens array 12A including micro-lenses 12A1. On the other hand, the typical comparison configuration employs the micro-lens 102 in place of the lens array 12A. It is to be noted that, to be more specific, FIG. 14A shows a simulation result for the embodiment whereas FIG. 14B shows a simulation result for the typical comparison configuration shown in FIG. 12. In the simulation result shown in FIG. 14B for the typical comparison configuration, variations are generated in the distribution of light rays incident to the light receiving surface 1030b. In the simulation result shown in FIG. 14A for the embodiment, on the other hand, no variations are observed in the distribution of light rays incident to the light receiving surface 130b due to the refraction effect of the second lens section S2. As is obvious also from these simulation results, unevenness of the light quantity can be reduced in the embodiment provided with the second lens section S2.

Next, the following description explains modifications 1 and 2 of the first embodiment described so far. The modifications 1 and 2 of the first embodiment are each obtained by modifying the configuration of the lens array 12A provided between the image pickup lens 11 and the image sensor 13 in the image pickup apparatus 1 according to the first embodiment. It is to be noted that, in the modifications 1 and 2 of the first embodiment, each configuration element identical with its counterpart employed in the first embodiment is denoted by the same reference numeral as the counterpart and the explanation of the identical configuration element is properly omitted.

<Modification 1>

Figure 15:
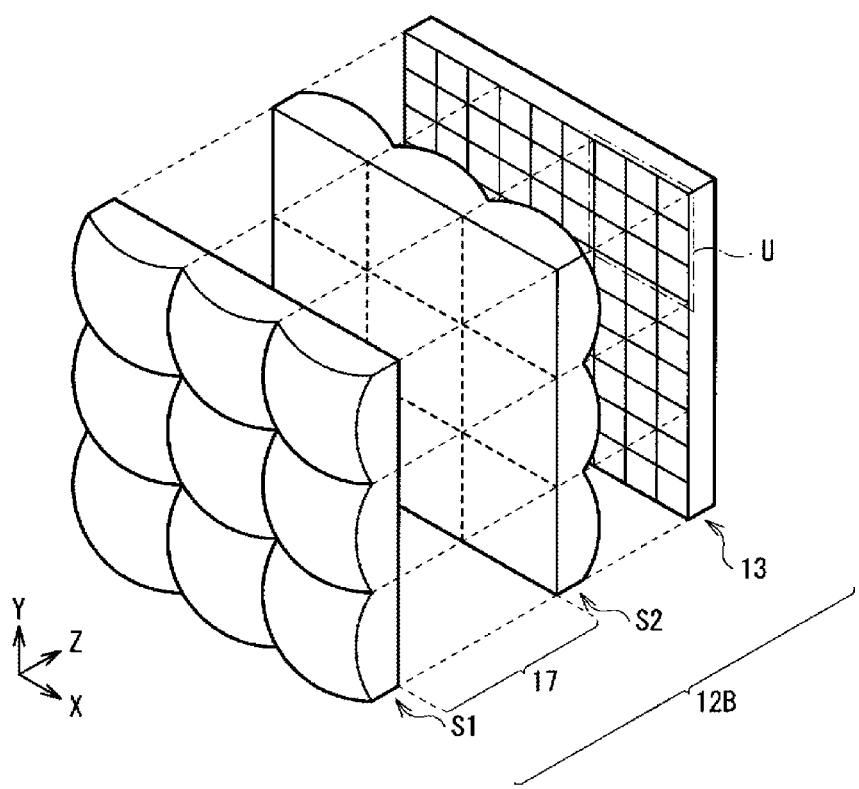
FIG. 15 is a diagram showing a perspective view of a rough configuration of a lens array and an image sensor which are included in a modification 1.

FIG. 15 is a diagram showing a perspective view of a rough configuration of a lens array 12B and an image sensor 13 which are included in a modification 1. In the same way as the lens array 12A of the first embodiment, the lens array 12B of the modification 1 includes a plurality of first lens sections S1 on a side close to the image pickup lens 11 not shown in FIG. 15 and a plurality of second lens sections S2 on a side close to the image sensor 13. The first lens sections S1 and the second lens sections S2 are provided in such a way that the first lens sections S1 rightly face their corresponding second lens sections S2. It is to be noted that, also in the case of the configuration shown in FIG. 15, for the sake of simplicity, FIG. 15 shows only areas in which only 3×3 first lens sections S1 are laid out in the X and Y directions to form a matrix. By the same token, only 3×3 second lens sections S2 are also laid out in the X and Y directions to form a matrix. Since every nine pixels on the image sensor 13 are allocated to one of the second lens section S2 in the lens array 12B, the image sensor 13 has only 9×9 pixels for all the 3×3 second lens sections S2.

In the case of the modification 1, however, an air layer 17 exists between the first lens sections S1 and the second lens sections S2 in the lens array 12B. That is to say, the first lens section S1 and the second lens section S2 are provided as separate bodies by separating the first lens section S1 and the second lens section S2 from each other by an optical distance determined in advance. This optical distance is the same distance as the inter-lens distance in the first embodiment. Much like the first embodiment described above, the shapes of the first lens section S1 and the second lens section S2 as well as the material used for making the first lens section S1 and the second lens section S2 do not need to be prescribed in particular. As an example, nevertheless, the planar-convex lens shape is assumed here as the lens shape.

Also in such a configuration, the first lens section S1 is provided on typically the focal plane of the image pickup lens 11 to guide incident light rays coming from the image pickup lens 11 to propagate in a direction toward the image sensor 13 while separating the incident light rays to propagate in a plurality of viewpoint directions. The second lens section S2 has a function to refract principal light rays passing through the first lens section S1 to propagate in a direction approaching the optical axis of the first lens section S1. To put it in detail, in the lens array 12B, the first lens section S1 and the second lens section S2 are provided in such a way that the focal plane of the second lens section S2 is placed on the principal surface of the first lens section S1 whereas the focal plane of the first lens section S1 is placed on the principal surface of the second lens section S2.

In the same way as the first embodiment described before, on the light-emanation side of such a lens array 12B, an image sensor 13 is provided. Each block area U in the image sensor 13 is allocated to one of micro-lenses composing the lens array 12B. Each block area U in the image sensor 13 has m×n pixels whereas each of the micro-lenses composing the lens array 12B has a first lens section S1 and a second lens section S2 which rightly face each other.

In the modification 1, as described above, the first lens section S1 and the second lens section S2 which are included in the lens array 12B can be provided separately from each other. Even with such a configuration, nonetheless, it is possible to provide effects equivalent to those of the first embodiment.

<Modification 2>

Figure 16:
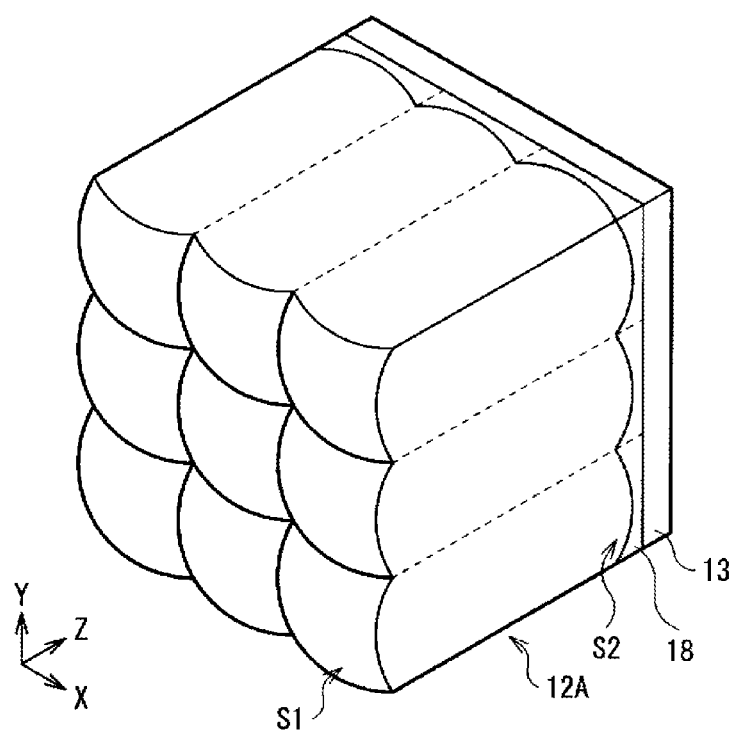
FIG. 16 is a diagram showing a perspective view of a rough configuration of a lens array and an image sensor which are included in a modification 2.

FIG. 16 is a diagram showing a perspective view of a model representing a rough configuration of a lens array 12A and an image sensor 13 which are included in a modification 2 by integrating the lens array 12A and the image sensor 13 with each other. It is to be noted that the on-chip lenses of the image sensor 13 are not shown in FIG. 16. In the modification 2, the lens array 12A having first lens sections S1 and second lens sections S2 is provided by integrating the lens array 12A with the image sensor 13. That is to say, the modification 2 has a structure in which the second lens sections S2 of the lens array 12A and the image sensor 13 are created to form a stack including the on-chip lenses not shown in the figure and a resin layer 18. The on-chip lenses and the resin layer 18 are provided between the second lens sections S2 and the image sensor 13. Such an integrated structure can be created as a stack including at least the on-chip lenses, the resin layer 18, the second lens sections S2 and the first lens sections S1 which are created on the image sensor 13. For example, on the image sensor 13, the on-chip lenses, the resin layer 18 and the second lens sections S2 are created sequentially in the order. Then, the first lens sections S1 are further constructed on another resin layer created on the second lens sections S2 in order to build the integrated structure. As an alternative, the lens array 12A is created by adoption of the technique described before. Then, the lens array 12A is brought into contact with the upper surface of the image sensor 13, in which the on-chip lenses have been created, through the resin layer 18. In either case, the lens shapes of the first lens section S1 and the second lens section S2 can be designed properly by taking the refraction index of a material used for making each layer of the stack into consideration.

In the modification 2 described above, the lens array 12A can be provided by integrating the lens array 12A with the image sensor 13 including the on-chip lenses. Even with such a configuration, it is possible to provide effects equivalent to those of the first embodiment. In addition, by integrating members ranging from the lens array 12A to the image sensor 13 to create an integrated structure, the members can be provided in the image pickup apparatus 1 without the need to adjust the positions of the members to each other. On top of that, it is possible to prevent shifts of the positions of the members from occurring with the lapse of time as positional shifts. As a result, it is possible to provide an image pickup apparatus 1 offering excellent position adjustment precision.

Second Embodiment

Figure 17:
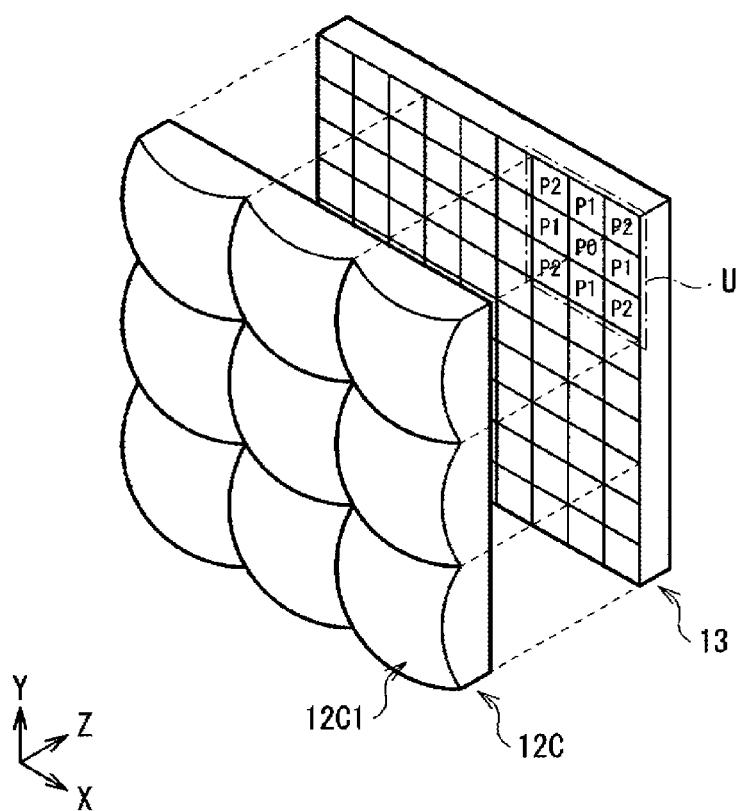
FIG. 17 is a diagram showing a perspective view of a rough configuration of a lens array and an image sensor which are included in a second embodiment of the present disclosure.
Figure 18:
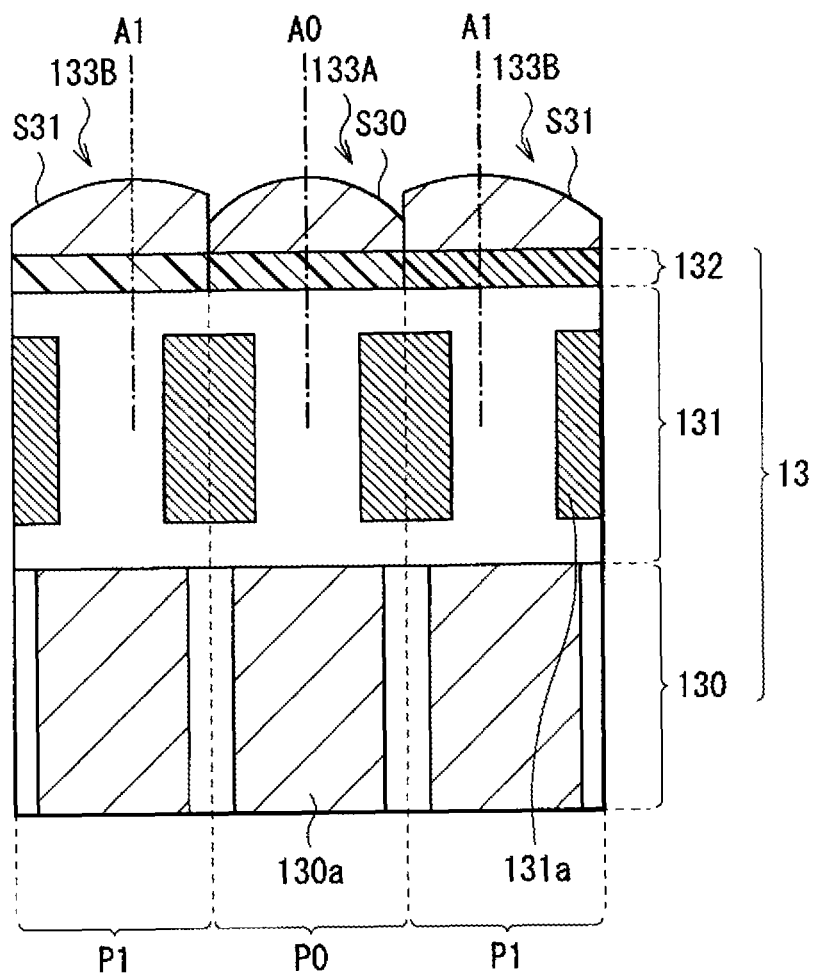
FIG. 18 is a diagram showing a model representing a rough configuration of on-chip lenses provided on an image sensor shown in FIG. 17.

Next, a second embodiment of the present disclosure is explained as follows. It is to be noted that every configuration element employed in the second embodiment as an element identical with its counterpart included in the first embodiment is denoted by the same reference numeral as the counterpart and the identical configuration element is not explained again in the following description.
[Configuration]
FIG. 17 is a diagram showing a perspective view of a rough configuration of a lens array 12C and an image sensor 13 which are included in the second embodiment. The lens array 12C according to the second embodiment has a plurality of micro-lenses 12C1 on the focal plane of the image pickup lens 11, each of the micro-lenses 12C1 corresponding to a first lens section S1 employed in the first embodiment. However, the lens array 12C includes no second lens section S2. For the sake of simplicity, FIG. 17 also shows the lens array 12C which has only 3×3 first lens sections S1 laid out in the X and Y directions to form a matrix. Since nine pixels P on the image sensor 13 are allocated to one of the first lens section S1 in the lens array 12C, the image sensor 13 has only 9×9 pixels P for all the 3×3 first lens sections S1. In this embodiment, however, for the sake of simplicity, instead of showing all 9×9 on-chip lenses 133 on the image sensor 13, only on-chip lenses 133A to 133C are described below as on-chip lenses each provided on the light receiving surface of the image sensor 13 for a pixel P. In addition to the light converging function, the on-chip lenses 133A to 133C also have the same function as the second lens sections S2 employed in the first embodiment. The configuration of the on-chip lenses 133A to 133C is described as follows.
(On-chip Lenses 133A to 133C of the Second Embodiment)
FIG. 18 is a diagram showing a model representing a cross-sectional configuration of the on-chip lenses 133A and 133B provided on the image sensor 13. However, FIG. 18 does not show the on-chip lens 133C. Also in the case of the second embodiment, each of the on-chip lenses 133A to 133C is provided for a pixel P in the same way as the first embodiment. Much like the first embodiment, each of the on-chip lenses 133A to 133C functions as a light converging lens. In the case of the second embodiment, however, the optical axes of the on-chip lenses 133A to 133C provided for respectively pixels P0, P1 and P2 not shown in FIG. 18 cross the pixels P0, P1 and P2 respectively at positions different from each other. The optical axis of an on-chip lens 133 is also referred to as the so-called core of the on-chip lens 133. The optical axes of the on-chip lenses 133A to 133C are also referred to as respectively the cores A0 to A2 of the on-chip lenses 133A to 133C.

The on-chip lens 133A provided on a central pixel P0 existing at the center of a block area U has such a lens shape that the optical axis A0 of the on-chip lens 133A coincides with the center of the lens aperture shape (which is an XY planar shape) of the on-chip lens 133A. On the other hand, a peripheral pixel P1 is a pixel adjacent to the central pixel P0, being separated away from the central pixel P0 in the X or Y direction. The on-chip lens 133B provided on the peripheral pixel P1 has such a lens shape that the optical axis A1 of the on-chip lens 133B is shifted away from the center of the lens aperture shape of the on-chip lens 133B in the inward direction toward the central pixel P0. Furthermore, a peripheral pixel P2 is a pixel adjacent to the central pixel P0, being separated away from the central pixel P0 in a diagonal direction of the block area U. The on-chip lens 133C provided on the peripheral pixel P2 has such a lens shape that the optical axis A2 of the on-chip lens 133C is further shifted away from the center of the lens aperture shape of the on-chip lens 133C in the inward direction. That is to say, an on-chip lens 133 provided on a peripheral pixel P has such a lens shape that the longer the distance between the peripheral pixel P and the central pixel P0 provided at the center of the XY plane of the block area U, the longer the distance by which the position of the optical axis of the on-chip lens 133 is shifted away from the center of the lens aperture shape of the on-chip lens 133 in the inward direction.

Figure 19A:
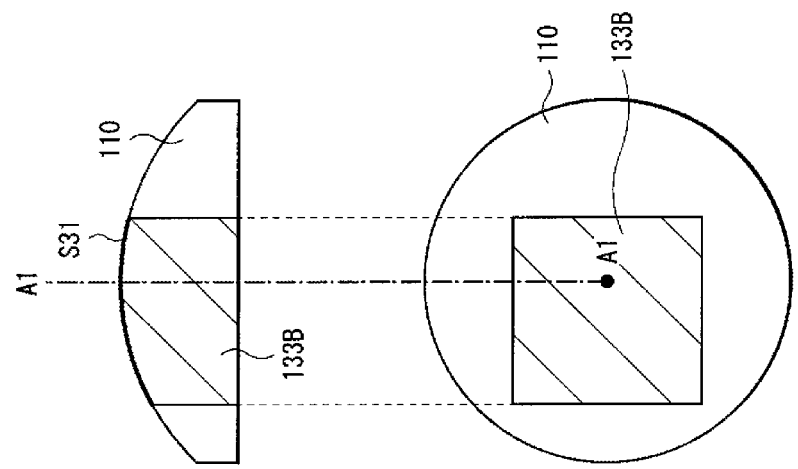
FIGS. 19A and 19B are a plurality of explanatory diagrams to be referred to in description of a typical process of creating the on-chip lens shown in FIG. 18.
Figure 19B:
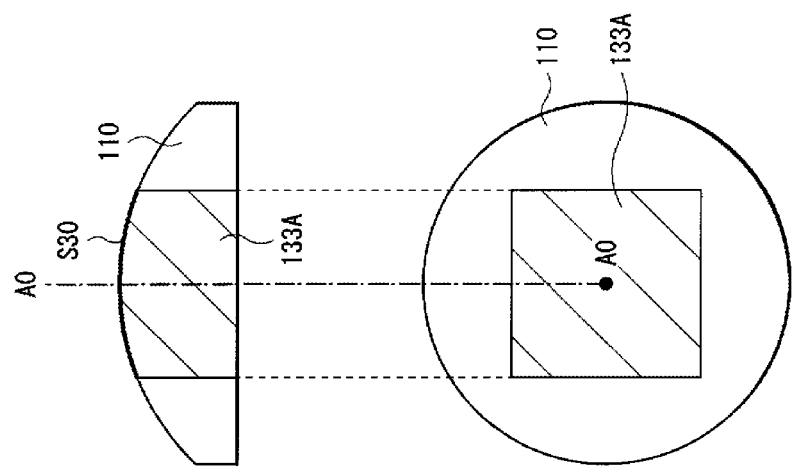

It is to be noted that each of the on-chip lenses 133A to 133C has a shape with the mother lens thereof partially cut out. In actuality, however, the area to be cut out is shifted by a distance according to the position of the pixel P associated with the on-chip lens 133. That is to say, as shown in FIG. 19A, the on-chip lens 133A has a shape obtained by cutting out only the central portion of the mother lens 110. As shown in FIG. 19B, on the other hand, the on-chip lens 133B has a shape obtained by cutting out a portion shifted from the center of the mother lens 110. The on-chip lens 133C also has a shape obtained in the same way as the on-chip lens 133B.
[Functions and Effects]
Also in the case of the second embodiment, a lens array 12C is provided between the image pickup lens 11 and the image sensor 13 in the same way as the first embodiment in a configuration like the one shown in FIG. 1. Thus, the lens array 12C separates incident light rays passing through the image pickup lens 11 from each other to propagate in a plurality of viewpoint directions toward different pixels P on the image sensor 13. As a result, different pixels P on the image sensor 13 receive the light rays propagating in the viewpoint directions, acquiring taken-image data D0. Then, by carrying out image processing like the one explained before on such taken-image data D0, a plurality of viewpoint images can be obtained.

Figure 20:
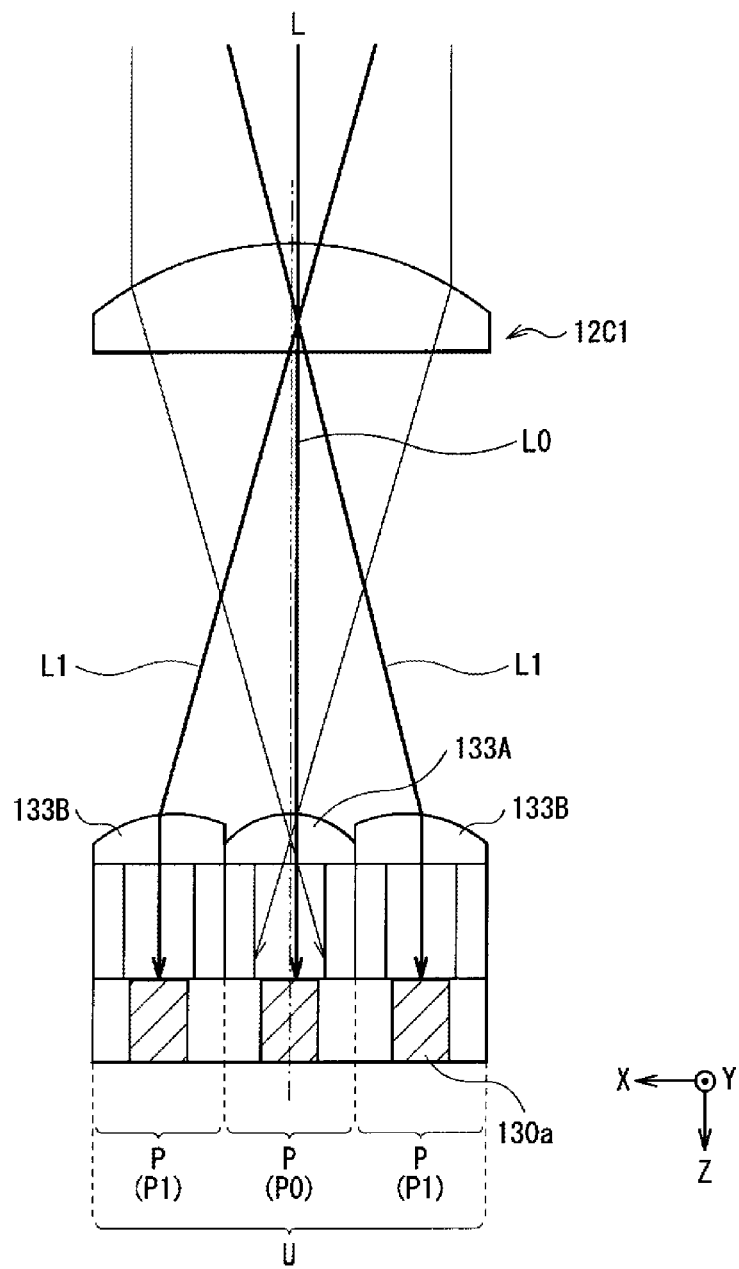
FIG. 20 is an explanatory diagram showing a model to be referred to in description of light rays incident to the image sensor in the second embodiment.

In the second embodiment, however, as shown in FIG. 20, principal light rays L passing through the image pickup lens 11 and the micro-lens 12C1 include a principal light ray L0 which propagates to the central pixel P0 in a block area U of the image sensor 13. The principal light ray L0 propagating to the central pixel P0 passes through the on-chip lens 133A along the optical axis Z2 and then hits the light receiving surface 130b of the sensor section 130 in a direction perpendicular or approximately perpendicular to the light receiving surface 130b. That is to say, the principal light ray L0 propagating to the central pixel P0 hits the photodiode 130a in a direction perpendicular or approximately perpendicular to the light receiving surface 130b. Thus, in the pixel P0, the photodiode 130a is capable of easily receiving the principal light ray L0 passing through the micro-lens 12C1 without incurring a loss.

In addition, the principal light rays L also include a principal light ray L1 which propagates in a direction toward the peripheral pixel P1 in the block area U. In the on-chip lens 133B provided on the peripheral pixel P1, however, the principal light ray L1 is refracted to propagate in a direction approaching the optical axis Z2. It is to be noted that, as shown in none of the figures including FIG. 20, a principal light ray propagating to the peripheral pixel P2 is also refracted in the on-chip lens 133C provided on the peripheral pixel P2 to propagate in a direction approaching the optical axis Z2. Thus, the principal light rays L passing through the image pickup lens 11 and the micro-lens 12C1 are capable of arriving at the pixels P with ease in a direction approximately perpendicular to the light receiving surface 130b. That is to say, it is possible to avoid generation of unevenness of the quantity of the received light. In addition, since the quantity of a light ray absorbed by the sensor section 130 is reduced, it is possible to prevent noises from being generated due to the opto-electrical conversion effect.

As described above, according to the second embodiment, in the image pickup apparatus 1 making use of the image pickup lens 11, the lens array 12C and the image sensor 13 to obtain an image while separating light rays from each other to propagate in a plurality of viewpoint directions, the image sensor 13 includes on-chip lenses 133A to 133C on a side facing the lens array 12C. Each of the on-chip lenses 133A to 133C has a shape formed by shifting its optical axis by a distance according to the position of a pixel P on which the lens 133 is created. Thus, it is possible to guide a principal light ray passing through the image pickup lens 11 and the lens array 12C to the image sensor 13 in a direction approximately perpendicular to the light receiving surface of a pixel P provided in the image sensor 13. As a result, it is possible to obtain effects equivalent to those provided by the first embodiment.

Next, the following description explains a modification 3 serving as a modified version of the second embodiment described so far. The modification 3 of the second embodiment is obtained by modifying the configuration of the on-chip lens provided on the image sensor 13 in the image pickup apparatus 1 according to the second embodiment. It is to be noted that, in the modification 3 of the second embodiment, each configuration element identical with its counterpart employed in the first and second embodiments is denoted by the same reference numeral as the counterpart and the explanation of the identical configuration element is properly omitted.

<Modification 3>

In the case of the second embodiment described above, each block area U including 3×3 pixels is allocated to a micro-lens 12C1. In the case of the modification 3, on the other hand, the number of pixels included in a block area U may be greater than that for the second embodiment. Even if the number of pixels included in a block area U is greater than that for the second embodiment, in the same way as the second embodiment, the optical axis of an on-chip pixel is further shifted by a distance according to the position of the pixel provided in the block area U as a pixel associated with the on-chip lens.

Figure 21:
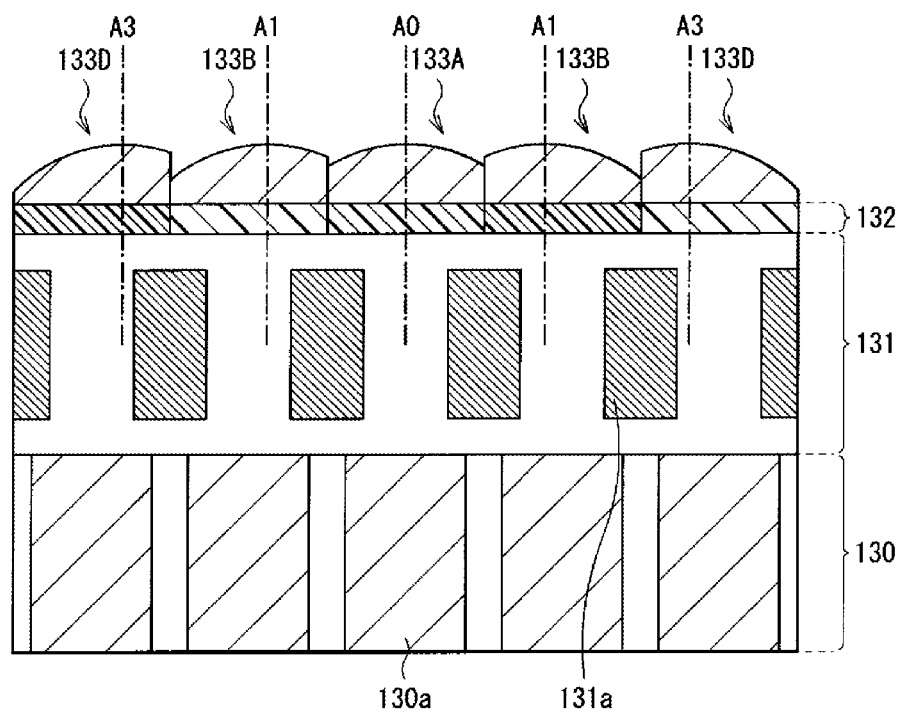
FIG. 21 is a diagram showing a model representing a rough configuration of an image sensor and its on-chip lens which are included in a modification 3.

FIG. 21 is a diagram showing a typical configuration of the modification 3 in which typical on-chip lenses 133A, 133B and 133D are selected among on-chip lenses created on 5×5 pixels included in a block area U allocated to a micro-lens 12C1 included in the lens array 12C. As shown in this figure, even if the number of pixels included in a block area U allocated to a micro-lens 12C1 is greater than that for the second embodiment, it is possible to create a configuration in which the optical axes A0, A1 and A3 of the on-chip lenses 133A, 133B and 133D respectively are laid out to form a concentric circular shape.

<Modification 4>

Figure 22:
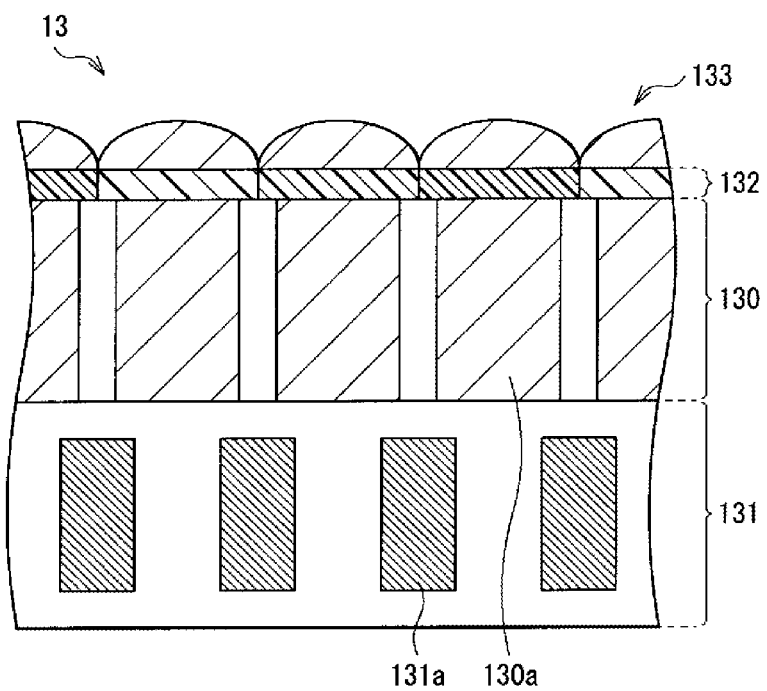
FIG. 22 is a diagram showing a model representing a rough configuration of a rear-surface radiation image sensor and its on-chip lens which are included in a modification 4.

In the first and second embodiments described earlier, the image sensor 13 is a sensor of the front-surface radiation type. However, the image sensor 13 can also be a sensor of the so-called rear-surface radiation type. FIG. 22 is a diagram showing a model representing a typical configuration of a rear-surface radiation image sensor 13. In the image sensor 13 having the rear-surface radiation type like the one shown in the figure, the wiring layer 131 is provided on a side opposite to the light incidence side of the sensor section 130 including photodiodes 130a. Thus, a light ray passing through the on-chip lens 133 can be received by the sensor section 130 without passing through the wiring layer 131. As a result, the light receiving sensitivity is high in comparison with the image sensor 13 having the front-surface radiation type so that it is possible to implement an image pickup apparatus 1 having approximately doubled brightness.

Embodiments and modifications have been explained so far. However, implementations of the present disclosure are by no means limited to the embodiments and the modifications. That is to say, it is possible to make a variety of changes to the embodiments and the modifications. In the embodiments described above for example, a block area including typically m×n (=3×3) pixels is allocated to a micro-lens. However, the block area allocated to a micro-lens does not have to include 3×3 pixels. For example, it is possible to set m and n at 2 or an integer not smaller than 4. It is even possible to set m and n at integers different from each other.

In addition, the embodiments described above implement an image pickup apparatus provided by the present disclosure to serve as a typical apparatus which includes an image processing section for generating a viewpoint image. However, the image pickup apparatus provided by the present disclosure does not have to include such a processing section.

The present disclosure contains subject matter related to that disclosed in Japanese Priority Patent Application JP 2011-052002 filed in the Japan Patent Office on Mar. 9, 2011, the entire content of which is hereby incorporated by reference.

What is claimed is:

1. An image pickup apparatus comprising:
an image pickup lens;
an optical system having a lens array; and
an image pickup device for receiving transmitted light rays passing through said image pickup lens and said optical system to acquire data of a taken image,
wherein the lens array includes a plurality of first lens sections provided on an image creation surface of the image pickup lens and a plurality of second lens sections configured to refract principal light rays passing through the first lens sections to propagate in directions approaching optical axes of the first lens sections,
wherein principal surfaces of the second lens sections are disposed on respective focal planes of the first lens sections, and principal surfaces of the first lens sections are disposed on respective focal planes of the second lens sections.

2. The image pickup apparatus according to claim 1 wherein
said second lens sections face said respective first lens sections.

3. The image pickup apparatus according to claim 1 wherein said first lens sections and said second lens sections are provided in said lens array by integrating said first lens sections and respective second lens sections with each other.

4. The image pickup apparatus according to claim 3 wherein said lens array and said image pickup device are provided by integrating said lens array and said image pickup device with each other.

5. The image pickup apparatus according to claim 1 wherein:
said image pickup device has a plurality of pixels laid out two-dimensionally;
said optical system includes said lens array and a plurality of third lens sections provided for the respective plurality of pixels, said third lens sections being provided on a side of said image pickup device to face said lens array, said third lens sections having a light converging function; and
said third lens sections refract principal light rays passing through said first and second lens sections to propagate in directions approaching said optical axes.

6. The image pickup apparatus according to claim 5 wherein:
each of the first and second lens sections is exposed to a block area including m×n of said pixels where m and n are integers equal to or greater than 1 but m and n are never both equal to 1; and
optical axes of said third lens sections are placed at different locations from each other determined in accordance with positions in said block area of said pixels for which said third lens sections are respectively provided.

7. The image pickup apparatus according to claim 1, wherein the principal light rays pass through respective focal points of the first lens sections.

8. The image pickup apparatus according to claim 1, wherein the second lens sections are configured to refract the principal light rays to propagate in directions substantially parallel to the optical axes of the first lens sections.

9. The image pickup apparatus according to claim 1, wherein the plurality of first lens sections is disposed in a focal plane of the image pickup lens.

* * * * *